United States Patent [19]

Renault

[11] 4,428,528

[45] Jan. 31, 1984

[54] ENVIRONMENTAL THERMOSTAT ASSEMBLY

[75] Inventor: Joel E. Renault, Saint-Grégoire, France

[73] Assignee: Delta Dore S.A., Combourg, France

[21] Appl. No.: 439,111

[22] Filed: Nov. 4, 1982

[30] Foreign Application Priority Data

Nov. 12, 1981 [EP] European Pat. Off. ........ 81401787.7

[51] Int. Cl.³ .................... F23N 5/20; G05D 23/00
[52] U.S. Cl. ................................ 236/46 R; 165/12; 236/94; 364/557
[58] Field of Search .................. 236/46 R, 47; 165/12; 364/557, 569; 340/309.1

[56] References Cited

U.S. PATENT DOCUMENTS

| 4,154,397 | 5/1979 | Carlson | 236/46 R |
| 4,213,562 | 7/1980 | Garrett et al. | 236/46 R |
| 4,277,784 | 7/1981 | Hyltin | 236/47 X |

Primary Examiner—W. E. Wayner
Attorney, Agent, or Firm—Laff, Whitesel, Conte & Saret

[57] ABSTRACT

A programmable thermostat has an associated electronic control circuit. There is a coding matrix and a multiplicity of programs which may be selected via the matrix. The user may select two set points to cause two programs to work in an interrelated manner, one for high heat requirements and one for low heat requirements. A clock may call in the two programs in any pre-selected manner such as: high heat in the morning, low heat as soon as the house has heated, high heat in the evening when the outside temperature falls, and low heat at night.

9 Claims, 9 Drawing Figures

ENVIRONMENTAL THERMOSTAT ASSEMBLY

The present invention relates to an environment thermostat assembly with a daily programming device, which comprises a thermostat, a digital clock, a program selecting circuit, a reference value switching circuit, and a control circuit for controlling the switching circuit, which control circuit is monitored by the digital output of the digital clock and by the program selecting circuit.

The French Pat. No. 2,449,922 describes a device comprising environment thermostats in combination with an hour switch, in which a day thermostat is mounted in series with a night thermostat, and in which the day thermostat may be short-circuited by a contact controlled by a clock motor. A secondary cell is provided, which is permanently charged through a rectifier circuit from the mains, in order to insure the working of the clock motor in case of power failure. A secondary cell has specific disadvantages, and the cost for the rectifier circuit and the charging current are important. Furthermore, the use of a clock motor with the control means of the short-circuiting contact, which are not described, results in important dimensional requirements. At last, the mains must be connected, in addition to the two wires to the heat source.

The French Pat. No. 2,425,810 describes a device with a digital clock for periodically switching programmed periods of increasing and lowering temperature in buildings. The device comprises at least two thermostats, the thermostats being switched by the output of a comparator having an input connected to the output of a current time memory and two other inputs which are respectively connected to two programmable switch time memories. The means used in the device, digital memories and digital comparator, are relatively expensive. Moreover, the device allows the programming of only one time for the beginning of the comfort temperature and one time for the beginning of the lowered temperature. Besides, the digital clock is no longer energized in case of power failure. At last, a third wire is provided for the working of the clock.

The French Pat. No. 2,385,135 describes a device with a thermostat having two reference values, a digital clock having an output signal which is converted into a saw-tooth analog voltage of a 24-hour duration, and a series of pairs of analog comparators for switching the order temperatures with respect to pairs of analog threshold points reached by the saw-tooth voltage. Secondary cells are provided for feeding the clock in case of power failure. In the device, as the switching times are determined in an analog mode, all the advantages of the digital technics are not used. At last, a connection to the mains must be provided in addition to the wires toward the heat source.

Furthermore, most of the residential flats and private houses are presently equipped with a simple thermostat with a single reference temperature, the thermostat being connected through two electrical wires to an on/off control device of the boiler or any other heat source. It is also known that the thermostats are small-sized and are particularly simple to use.

It is an object of the invention to provide an environment thermostat assembly allowing two reference temperatures, a so-called comfort temperature and a so-called economical or lowered temperature, which can be predetermined with respect to the time, with only two wires for the connection to the heat source control device. The assembly is simple to use and its dimensional requirements are in the order of the simple thermostats hereabove mentioned. Moreover, the assembly must be able to be used in buildings intended for different purposes and, there, it must allow the choice among a plurality of programs which can comprise up to three comfort temperature daily periods in alternance with three lowered temperature periods.

The devices described in the French Patents hereabove mentioned do not appear to meet said requirements or have well-known disadvantages such as the use of a secondary cell.

Still another object of the invention is to provide an environment thermostat assembly with a daily programming device driven by a clock which is fed from an electrical source made of electrical primary cells. Electrical primary cells are now increasingly used and they have a single requirement, i.e. the circuits fed by the primary cells must have a very low consumption in order to avoid a too frequent replacement of the cells. Digital display clocks fed from primary cells are also increasingly utilized.

Accordingly to a feature of the invention, such an environment thermostat assembly is provided. The control circuit comprises a digital/decimal converter for converting the hour unit digital data into a one out of ten code signal, the ten outputs of the converter being connected to the vertical wires of a cross-point matrix having three pairs of output wires. The output pairs of the matrix are respectively assigned to the hours of which the tenth figure is 2, 1 and 0. The output wires are connected to the corresponding inputs of a logical circuit which has also a number of inputs connected to the active outputs of the clock when the hour tenth figures is 1 or 2, respectively. Some cross-points of the matrix are selectively connected in accordance with the different predetermined programs. The electronical contacts are mounted on the output wires of the matrix and controlled by the program selecting circuit. The output of the logical circuit are connected to a reference value adjusting potentiometer. The voltage transmitted to the potentiometer through the output of the logical circuit varies between two values in accordance with the logical levels of the inputs of the logical circuit.

According to another feature of the invention, the program selecting circuit has a number of outputs which are directly connected to the logical circuit, in order to bring the output potential of the logical circuit to one or another value, whatever be the time.

According to another feature of the invention, the thermostat comprises a bistable relay. The coil of the relay is energized in one direction or the other during the successive changes of state of the output signal of the temperature sensor of the thermostat. One of the contacts of the relay is for closing or opening the output circuit of the thermostat. The coil is de-energized between the changes of state of the output signal.

According to another feature of the invention, the output of the temperature sensor is at a high level for a heat demand and at low level in the other case. The sensor is connected to the first two inputs of first and second NAND gates, directly and through an inverter, the second inputs of the first and second NAND gates are respectively connected to the stationnary make contact and the stationnary rest contact of a second contact of the coil, of which the moving contact is at low level. The outputs of the first and the second NAND gates are respectively connected to the control inputs of a first and a second electronic contacts. The first electronic contact is mounted between the positive terminal of a first coil and the first terminal of the coil of which the second terminal is connected to the negative terminal of said first cell. The second electronic contact is mounted between the negative terminal of a second cell and the first terminal of the coil of which the second terminal is connected to the positive terminal of the second cell, the first contact being open when at rest position.

According to another feature of the invention, a delay circuit is mounted between the second input of the first NAND gate and the corresponding stationnary contact of the second contact.

According to another feature, the digital clock is fed by the cell source.

According to another feature, an inverter is mounted between the back panel output terminal of the clock and the corresponding input terminal of the display device. The other input terminal of the inverter is connected to the blinking output of the clock digital circuit. The inverter is controlled by a circuit which measures the voltage of the cell source and which switches the blinking output terminal to the back panel signal input of the display device when the voltage falls below a predetermined value.

The above mentioned and other features of the present invention will appear more clearly from the following description of various embodiments, the description being made in conjunction with the accompanying drawings, wherein.

Figure 1:
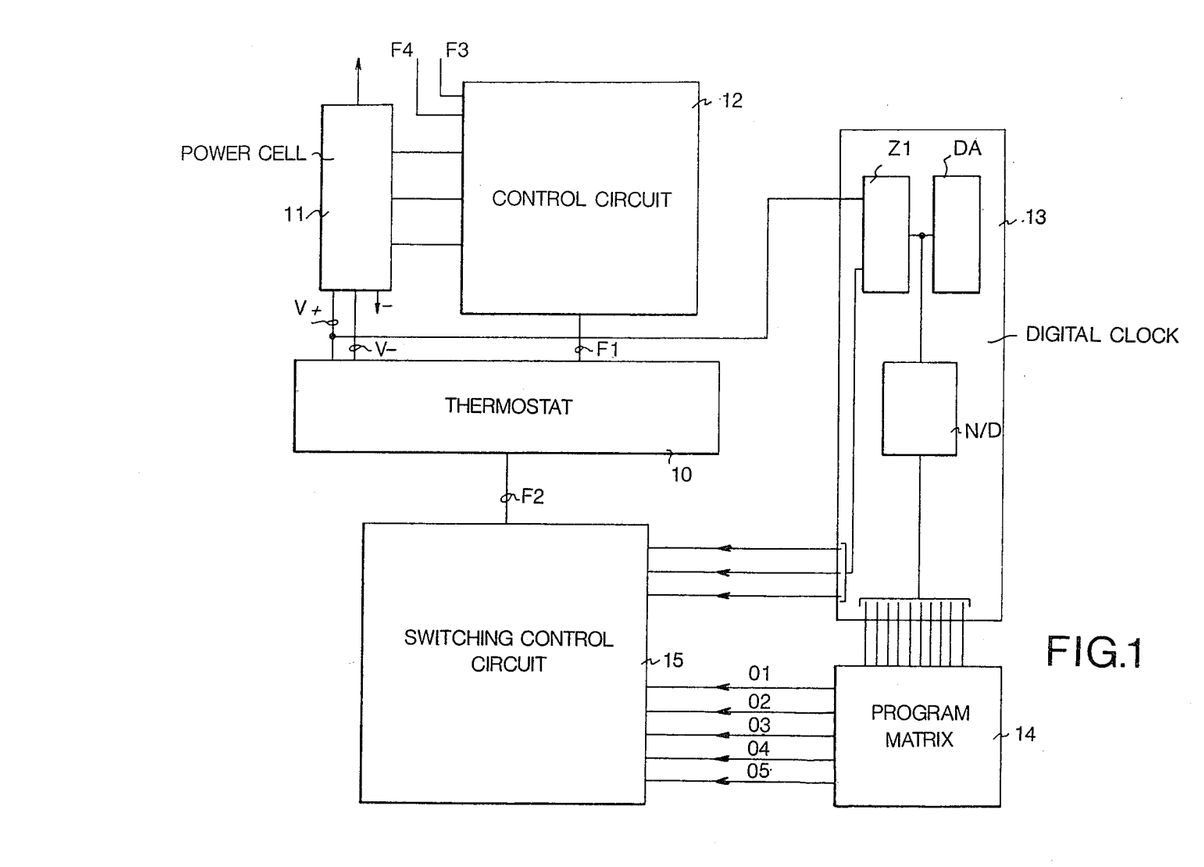
FIG. 1 is a block-diagram of a thermostat assembly according to the invention.

Referring to FIG. 1, the device according to the invention comprises a thermostat 10, a power cell source 11, a control circuit 12 for actuating the control member of the hot (or cold) source, not shown, a digital clock 13, a programming coding matrix 14 and a switching control circuit 15.

Figures 2, 6:
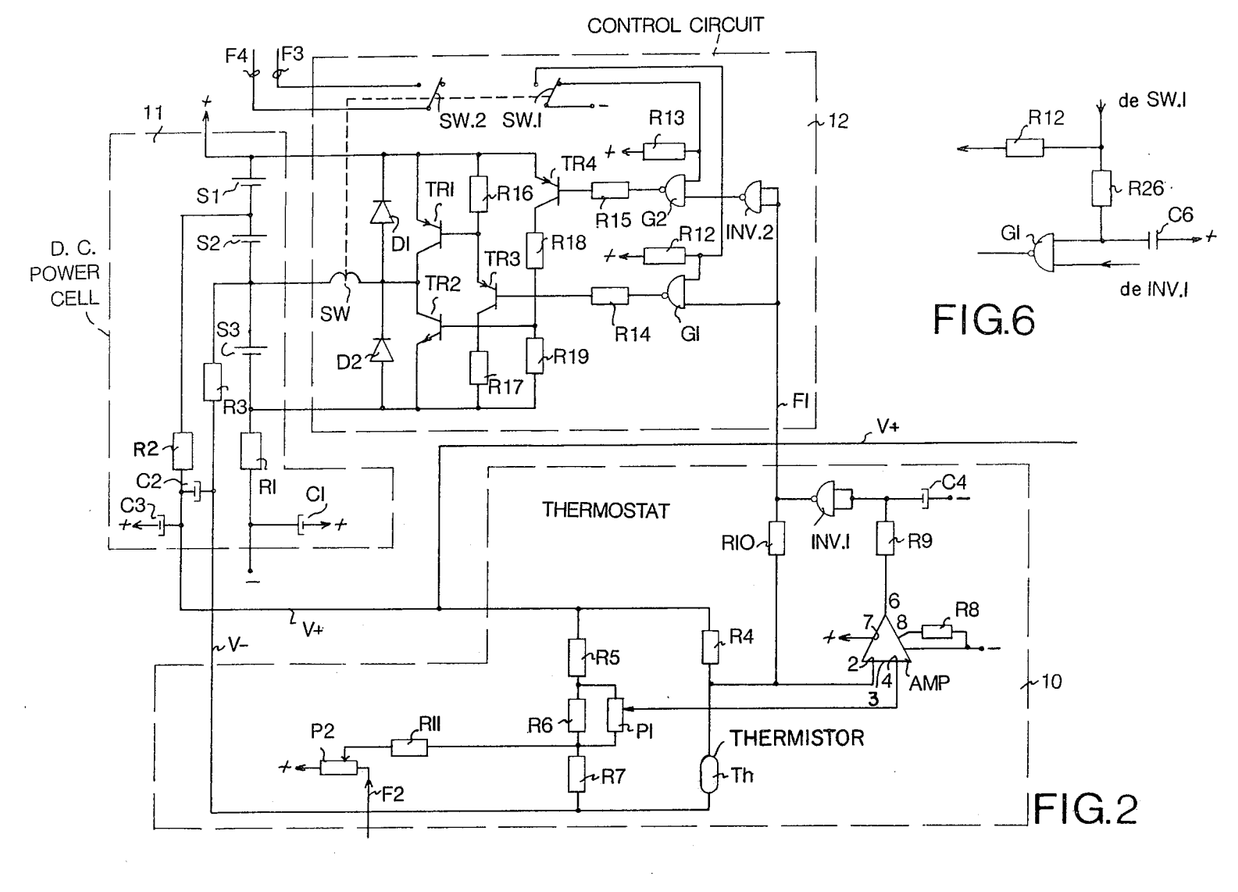
FIG. 2 is a schematic representation of the thermostat assembly, the primary cell source, and the output signal control circuit, in the device of the FIG. 1.
FIG. 6 depicts a modified embodiment for the control circuit of the FIG 2.

As shown in FIG. 2, the DC power source 11 comprises three primary cells S1, S2, S3 which are mounted in series, each of them having a emf of 1.5 V. The positive terminal of the cell S1 is connected to the terminal + of the source, while the negative terminal of the cell S3 is connected to the terminal — of the source, through a resisitor R1 of 1 kilohms. A capacitor C1 of 22 microfarads is mounted between the terminals + and — of the source. Moreover, the positive and negative terminals of the cell S2 are respectively connected to the two wires V— and V—, through the resistors R2 and R3 of 1 kilohms each, and a capacitor C2 of 2.2 microfarads is mounted between said wires. A capacitor C8 of 2.2 microfarads is also mounted between the wire V+ and the terminal +.

The thermostat 10 typically comprises a bridge of which a branch is made of a resistor R4 and a thermistor Th, and of which the other branch is made of three resistors R5, R6 and R7, the resistor R6 being mounted in parallel with a potentiometer P1. The junction between R4 and R5 is connected to the wire V+, while the junction between Th and R7 is connected to the wire V—. The terminal common to R4 and Th is connected to the terminal "2" of a differential amplifier Amp, while the sliding contact of the potentiometer P1 is connected to the terminal "3" of said amplifier. The amplifier Amp is of the type LM 4250CN, for instance, its terminal "7" being connected to the terminal +, its terminal "4" to the terminal —, and its terminal "8" to the terminal — through a resistor R8 of 2.2 megohms.

The output "6" of the amplifier Amp is connected to the terminal —, through a resistor R9 of 470 kilohms and a capacitor C4 of 2.2 microfarads. The resisitor R9 and the capacitor C4 form a delay circuit. The junction between R9 and C4 is connected to the input of an inverter INV1 which operates as a trigger of the type MC 14093BCP, and of which the output is connected, on one hand, to the input "2" of the amplifier Amp, through a resisitor R10 of 22 megohms, in order to form a feedback circuit which defines the hysteresis of the thermostat, and, on the other hand, to a wire F1 which, when at high level, indicates a "heat demand" state, and when at low level, indicates a "heat demand stop, state".

The junction between resistors R6 and R7 is also connected to the sliding contact of a potentiometer P2 through a resistor R11, one of the terminals of the potentiometer being connected to the terminal — of the source 11, and the other one to a wire F2.

In the control circuit 12, the wire F1 is connected, on one hand, to the input of a logical inverter INV2, and, on the other hand, to one of the inputs of a NAND gate G1, the other input of the gate being connected, on one hand, to the terminal + of power cell 11 (FIG. 1) through a resistor R12 of 2.2 megohms, and, on the other hand, to the make contact of a throw-over switch SW1. The output of the inverter INV2 is connected to one of the inputs of a NAND gate G2, of which the other input is connected, on one hand, to the terminal + of power cell 11 through a resistor R13 of 2.2 megohms, and, on the other hand, to the normal contact of the switch SW1. The moving contact of SW1 is connected to the power cell terminal — of the source 11.

The switch SW1 is the contact of a two-state electromagnetic relay of the type EBERLE 408-21-024, the coil SW of the relay being connected, on one hand, to the junction between cells S2 and S3, and, on the other hand, to the junction between the collectors of the two transistors TR1 and TR2.

The output of the NAND gate G1 is connected to the base of a PNP transistor TR3 through a resistor R14 of 10 kilohms, while the output of the NAND gate G2 is connected to the base of a PNP transistor TR4 through a resistor R15 of 10 kilohms. The emitter of the transistor TR3 is connected, on one hand, to the base of the PNP transistor TR1, and, on the other hand to the terminal + through a resistor R16 of 10 kilohms. The collector of the transistor TR3 is connected to the negative terminal of cell S3 through two serially connected resistors R18 of 160 ohms and R19 of 10 kilohms. The junction between R18 and R19 is connected to the base of the NPN transistor TR2. The emitter of transistor TR1 is connected to the terminal +, while the emitter of TR2 is connected to the negative terminal of cell S3. A diode D1 is mounted between the terminal + and the point common to the collectors of transistors TR1 and TR2. A diode D2 is mounted between the junction between and the negative terminal of S3.

The relay SW has a second make contact SW2 which connects the wires F3 and F4 when being in make condition, and disconnects the wires when being at rest condition. The wires F3 and F4 are connected to the control member of the heat source (e.g. a furnace), not shown, and have the same function as the output wires of a simple thermostat.

In the position shown in FIG. 2, the relay SW is at rest and the contact SW2 is open; it means that there is no heat demand, and the contact SW1 connects the terminal − to one of the inputs of the gate G2, i.e. transfers a low level signal to said input. Therefore, the outputs of the gates G1 and G2 cannot enable either the transistor TR3, or the transistor TR4, and, as a result, the transistors TR1 and TR2 are not enabled either. There is no current through the coil SW at rest since the last two transistors are off.

When the output of INV1 is switched to high level as the ambient temperature decreases, the two inputs of the gate G1 are at high level, such that the output of G1 enables the transistor TR3 which, in turn, turns the transistor TR1 on. A current is therefore established from the terminal + to the negative terminal of cell S2, through the emitter-collector circuit of transistor TR1 and the coil SW, the latter changing the position of its contacts SW1 and SW2. The operated contact SW2 closes the circuit of wires F3 and F4, by which the heat source is actuated. Contact SW1 switches one of the inputs of gate G1 to a low level, by which the transistors TR3 and TR1 are turned off, and one of the inputs of G2 to high level, the other input of G2 being maintained at low level by the output of inverter INV2 the input of which is at a high level, by which the transistors TR2 and TR4 are maintained off. When the coil SW is energized, there is a strong in rush current and the voltage at the terminals of the cells decreases, but without disturbing the operation of the other electronic circuits for which the supply voltage is maintained by the capacitor C1.

When the reference temperature is reached, the output of inverter INV1 is switched to low level, and, therefore, the output of inverter INV2 is at high level. It results that the output of the gate G2 enables the transistor TR4 which turns the NPN transistor TR2 on. A current is therefore established from the positive terminal of cell S3 to its negative terminal, through the coil SW and the collector-emitter circuit of the transistor TR2. A current is thus established through the coil SW, of which the direction is opposite to the one of the previous current, in such a way that said coil opens its contact SW2 and switches its contact SW1 to normal state. With a low level on one of the inputs of gate G2, the transistors TR2 and TR4 are turned off. A high level is on one of the inputs of gate G1; but, the other input of gate G1 being at low level and, the transistors TR3 and TR1 remain off.

Thus, it appears that the coil is not energized between the switching time of SW, whereby the consumption of the primary cells is substantially reduced. The diodes D1 and D2 are provided for inhibiting the back end emf induced by the coil SW.

As it appears from the following, the wire F2 is at the potential of the terminal during the comfort period, and its potential is more positive than the potential of the terminal during the lowered temperature period. As a result, the junction between resistors R6 and R7, during a comfort period, has a potential which is more negative than its potential during a lowered period. Therefore, in case of a heat demand, the state of the output of the differential amplifier Amp is changed during a comfort period for a temperature which is higher than the change temperature of a lowering period. Practically, the potentiometer P1 allows the comfort temperature to be adjusted, and the potentiometer P2 allows an adjustment of lower temperature, during the economical periods.

The digital clock 13 (FIG. 3) is a commercially available clock which, as described, comprises an integrated circuit Z1 and a display device DA, with hours and minutes typically displayed in a seven-segment code. The integrated circuit Z1 is of the type ICM 723 sold by Intersil and is driven by a crystal QZ in a typical circuit connected to its terminal "33" and "34", with its terminal "32" connected to the terminal +, its terminal "31" connected to the wire V+ and its terminal "26" connected to the terminal −. A typical time reset circuit RH is connected to the terminals "36" and "37" of Z1.

Figure 3:
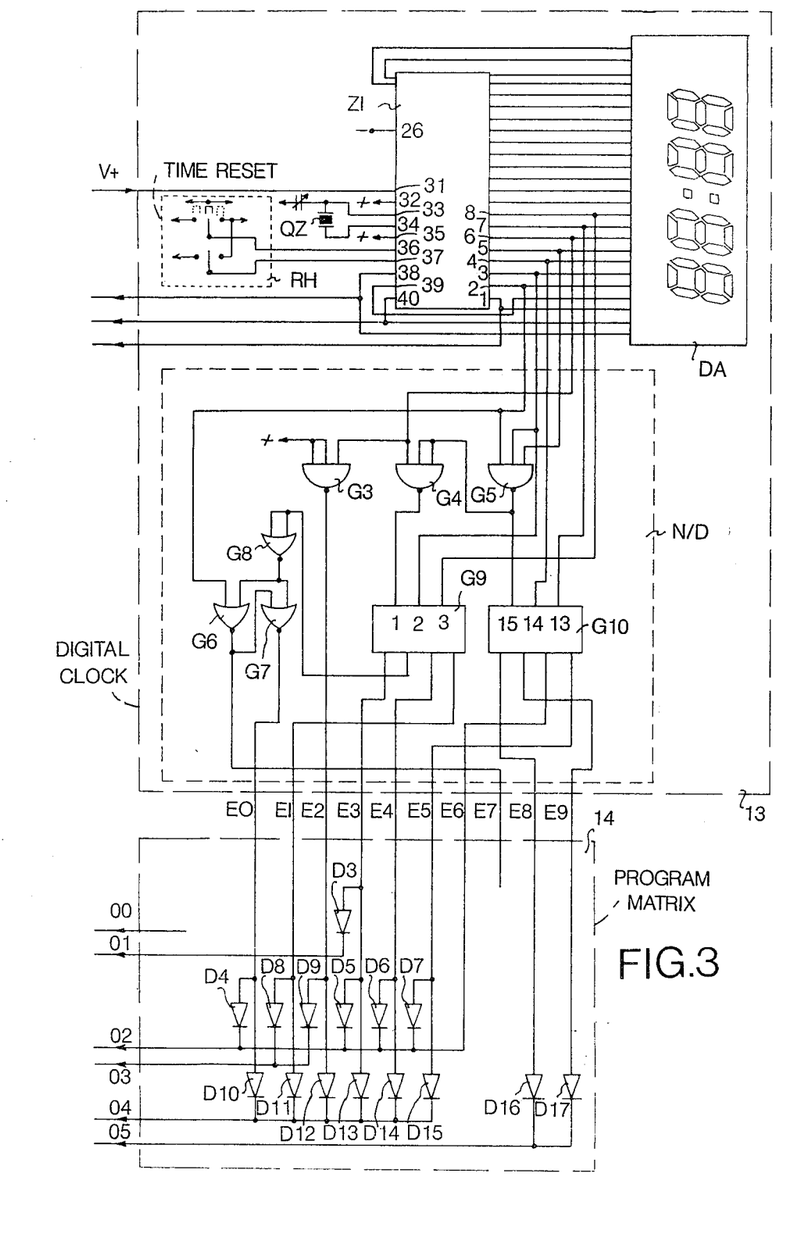
FIG. 3 is a schematic representation of the clock, the digital/decimal converter, and the programming matrix, in the device of the FIG. 1.

The terminals "2" to "8" of the circuit Z1, used for displaying the unit digit of the hours, are connected to the inputs of a digital/decimal converter N/D which comprises three NAND gates G3 to G5 of the type MC 14023BCP, three NOR gates G5 to G8 of the type MC 14001BCP and two logical circuits G9 and G10 of the type MC 146555BCP. The terminal "2" of integrated circuit Z1 is connected to one of the inputs of gate G5 and one of the inputs of gate G6. The terminal "3" of integrated circuit Z1 is connected to one of the inputs of gate G5 and one of the inputs of G9. The terminal "4" of integrated circuit Z1 is connected to one of the inputs of gate G10. The terminal "5" of integrated circuit Z1 is connected to the third input of gate G5. The terminal "6" of integrated circuit Z1 is connected to one of the inputs of gate G3 and one of the inputs of gate G4. The output "7" of integrated circuit Z1 is connected to one of the inputs of gate G10, while the output "8" is connected to one of the inputs of gate G9.

The output of gate G5 is connected to the third input of gate G10 and to two inputs of gate G4 in a parallel. The output of gate G4 is connected to the third input of gate G9. Two inputs of gate G8 are connected to the terminal +, and its output is connected to the input E2 of the matrix 14. The circuit G9 has four outputs, the first output being connected to the input E3 of matrix 14, the second output being connected to the inputs of gate G8, the third output being connected to the input E4, and the fourth output being connected to the input E1 of matrix 14.

The circuit G10 has four outputs, the first output being connected to the input E8, the second output being connected to the input E9, the third output being connected to the input E6, and the fourth output being connected to the input E5 of matrix 14. The output of the gate G8 is connected to one of the inputs of gate G6 and gate G7. The output of the gate G6 is connected to one of the inputs of the gate G7 and to the input G7 of matrix 14. At last, the output of gate G7 is connected to the input E0 of matrix 14. The terminals of the circuits G9 and G10 are shown in the drawing as having the numerical references of the manufacturer.

Practically, the converter N/D converts the digital data supplied by integrated circuit Z1 at its seven terminals "2" to "8" into "one out of ten" coded data supplied to the inputs E0 to E9 of the matrix 14. Each activated input E0 to E9 indicates the hour unit 0 to 9 displayed by DA. The structure of the converter N/D is given only by way of example, and it is obvious that components other than the components which are shown may be used. Therefore, the operation of N/D will not be further described.

The programming matrix 14 has three pairs of output wires 00, not used, and 01 to 05. With only the vertical wires from the inputs E0 to E9, and only the horizontal wires from the outputs 01 to 05, a cross-point matrix is obtained of which the wires may be referenced with respect to their respective original points. A diode D3 is mounted at the cross point of E3 and 01; diodes D4 to D7 are mounted at the cross points of E0, E3, E4 and E5, on one hand, and 02 on the other hand; diodes D8 and D9 are mounted at the cross points of E1 and E2, on one hand, and 03 on the other hand; diodes D10 to D15 are mounted at the cross points of E0 to E5, on one hand, and 04 on the other hand; and diodes D16 and D17 are mounted at the cross points of E8 and E9, on one hand, and 05 on the other hand. All these diodes are poled in the forward direction from the inputs to the outputs of the matrix 14.

Figure 4:
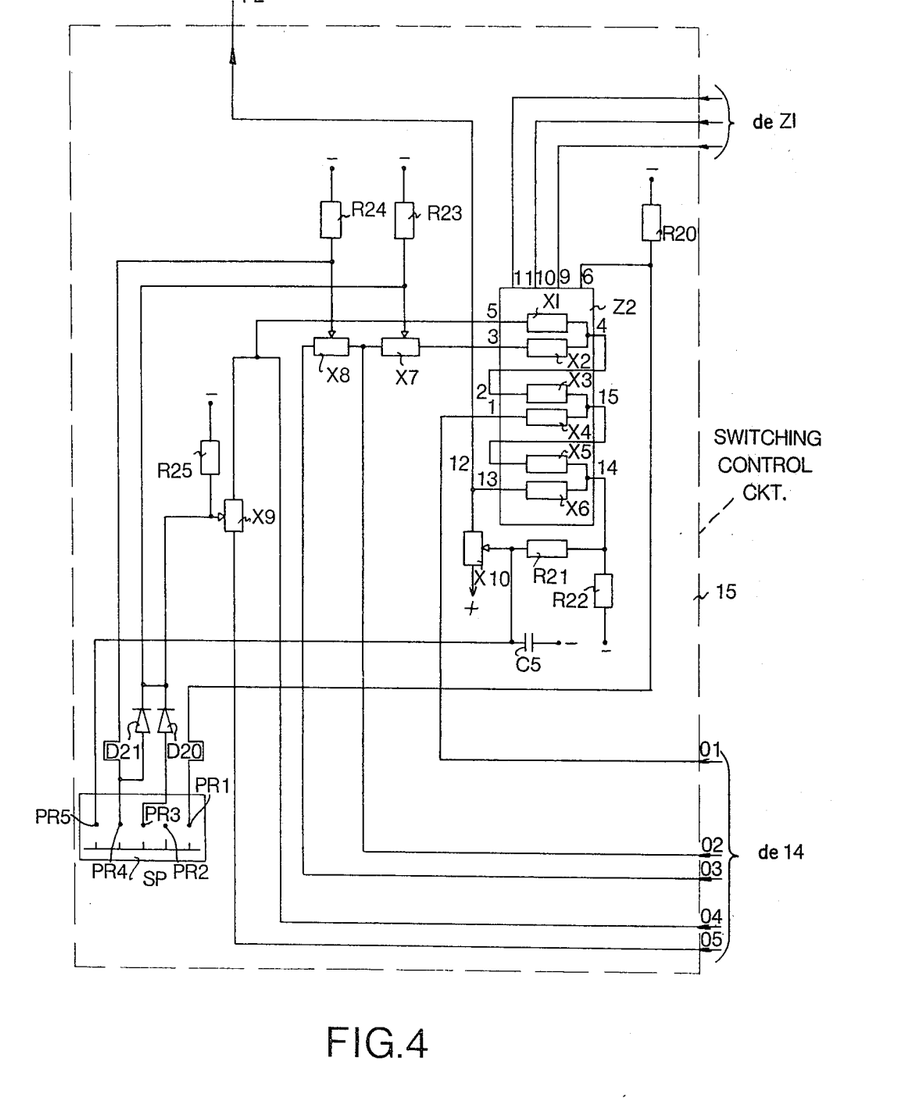
FIG. 4 is a schematic representation of the control circuit for switching the reference value of the thermostat.
Figure 5A:
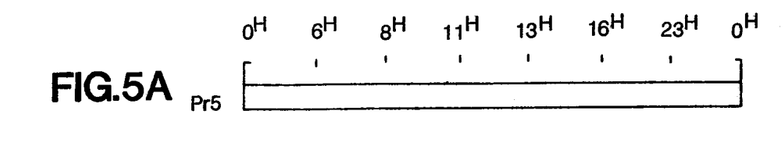
FIGS. 5A to 5e are graphs illustrating five different regulating programs.
Figure 5B:
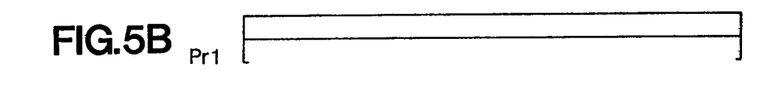
Figure 5C:
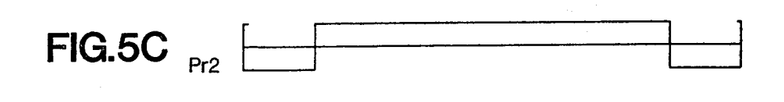
Figure 5D:
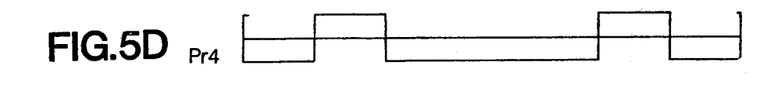
Figure 5E:
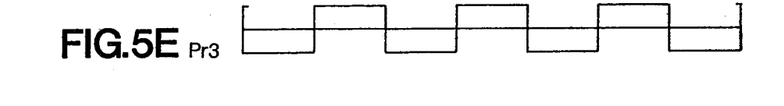

The switching control circuit 15 of the figure 4 comprises a switching digital circuit Z2 of the type MC 14053BCP in the present example, and a programm selector SP, with a number of components to be described in the following specification.

The terminals "1" to "6" and "9" to "15" are used in the circuit Z2. The circuit Z2 comprises three pairs of electronic contacts X1-X2, X3-X4 and X5-X6, each pair forming an inverter. The contact X1 connects the terminals "5" and "4" when the terminal "9" of Z2 is at low level, while the contact X2 connects the terminals "3" and "4" when the terminal "9" is at high level. The contact X3 connects the terminals "4" and "15", through "2", when the terminal "10" is at low level, while the contact X4 connects the terminals "1" and "15" when the terminal "10" is at high level. The contact X5 connects the terminals "15" and "14", through "2" when the terminal "11" is at low level, while the contact X5 connects the terminals "14" and "13" when the terminal "11" is at high level. The contacts X1 to X5 are inhibited when the terminal "6" is at high level.

With regard to the external connections of the circuit Z2, its terminal "1" is connected to the output 01 of the matrix 14, its terminal "3" is connected to the output 02 through an electronic contact X7, and to the output 03 contact through X7 and another electronic contact X8, its terminal "5" is directly connected to the output 04, and is connected to the output 05 through an electronic contact X9. Moreover, its terminal "6" is connected to the terminal − through a resistor R20, and to the terminal PR1 of the program selector SP. Its terminal "13" is connected to the terminal + through an electronic contact X10 of which the control input is connected to the terminal PR5 of SP, on one hand, and, on the other hand, to the terminal "14" through a resistor R21 of 1 megohm. The terminal "14" of integrated circuit Z2 is also connected to the terminal − through a resistor of R22 of 2.2 megohms, while the control input of contacts X10 is connected to the terminal − through a capacitor C5 of 1 nanofarad. At last, the terminals "9" and "10" are respectively connected to the terminals "1" and "40" of the clock circuit integrated circuit Z1, while the input "11" is connected to the output "38" of integrated circuit Z1. The outputs "1" and "40" of Z1 supply the ten digit data of the hours, said digit having only three possible values: 0 (not displayed by DA), 1 or 2.

The output "38" of Z1 indicates the state of the "back panel" BP of the displaying device DA. It will be remembered that the circuit ICM 7223 forming the circuit Z1 supplies, for each segment of the displaying device DA, a 32 Hz-AC signal which is in phase or in opposite phase with the "back panel" output in accordance with the state, activated or not activated, of the segment. Therefore, the signals supplied by the circuit Z1 to the converter N/D are also 32 Hz AC signals, such that the signals supplied by the circuit to the terminals "1", "3" and "5" of 22, through the matrix 14, are valid only when the output "38" of 22 is at a low level. The circuit formed by contact X6 of integrated circuit Z2, resistors R21, contact X10 and capacitor C5 enables storage of the preceding state of the terminal "13" of integrated circuit Z2 when the output "38" of integrated circuit Z1 is at a high level. In fact, when the preceding state of the terminals "13" and "14" is at a low level, the control input of contact X10 is at low level and contact X10 is open, such that the potential of the terminal − is transferred to "13" through resistor R22, terminal 14 and contact X6. But when the preceding state of the terminal "13" and "14" is a high level, the contact X10 is closed and potential of the terminal + is transferred to the terminal "13".

The programm selector SP has five terminals PR1 to PR5 which can be separately brought to the potential of the terminal + when the selector is actuated. As hereabove mentioned, the terminal PR1 is connected to the terminal "6" of integrated Z2 and the terminal PR5 is connected to the control input of contact X10. The terminal PR2 is not connected, PR3 is connected to the control inputs of the electronic contacts X7 and X9 through a diode D20; terminal PR4 is connected, on one hand, to the control inputs of the electronic contact X8. The control inputs of the contacts X7 to X9 are connected to the terminal −, through the ballast resistors R23 to R25 respectively.

At last, it will be also noted that the terminal "13" of the circuit Z2 is connected to the output wire F2, and, therefore, is the output signal terminal. In "comfort mode", the terminal "13" and the wire F2 are isolated, while in "lowered mode", said terminal and wire are at the positive potential of the terminal +. In the first case, the sliding contact of potentiometer P2, FIG. 2, is thus at the potential of the terminal −, while in the other case, said contact is at a potential between + and − which defines the difference of temperature.

The five possible programs will be now considered.

Terminal PR1 at the potential of the terminal + corresponds to the "permanent comfort state". In fact, the terminal "6" being at the potential +, the contacts X1 to X6 remain in an open position and terminal "13" remains isolated, whatever be the signals on the terminals "1", "3", "5", "9", "10" and "11" of integrated circuit Z2.

When terminal PR2 is connected to the terminal +, the contacts X7 to X9 remain in their open position. But the wire 01 is energized when the hour unit is equal to 3, and contact X4 is closed when the hour ten digit is equal to 2. It follows that the terminal "13" is connected to the terminal + for the hour which begins at 23H. Moreover, the wire 04 is energized when the hour unit digits are equal to 0 to 5, and contact X1 and X3 are closed when the hour ten digit is equal to 0. It follows that the terminal "13" is also connected to the terminal + for the hours which begins at 0H, 1H, . . . 5H, and that the lowered program is applied between 23H and 6H.

When the terminal PRS is connected to the terminal +, the same situation as the preceding one prevails, but, in addition , contacts X7 and X9 are closed. The wire 02 energizes the terminal "3" when the hour ten digit is equal to 1 and the unit digit is equal to 0, 3, 4, 5 or 6. The wire 05 energizes the terminal "5" when the ten digit is equal to 0 and the unit digit is equal to 8 or 9. Contact is closed in one case, and contact X1 in the other. The program is a lowered one between 23H and 6H, as hereabove, but also between 8H and 11H and between 13H and 16H.

When the terminal PR4 is connected to the terminal +, the same situation as the preceding one prevails, but, in addition, contact X8 is closed and, through the wire 03, the system operates in a lowered mode between 11H and 13H.

When the terminal PR5 is connected to the terminal +, the contact X10 is permanently closed and the system operates in permanently lowered mode.

It should be understood that the configuration of the diode matrix 14 has been given by way of example and that, while enabling the system to meet most of the usual requirements of the users, the matrix may be provided with other configurations to meet the most usual requirements of users having other constraints. It should be also understood that the diodes D3 to D21 represent only an example of cross-points. In the same way, the structure of the logical circuit of the FIG. 4 may be changed.

The FIG. 6 depicts an alternative for the circuits 12, more specifically an input circuit for the gate G1 of the FIG. 2. In this alternative, a resistor R26 is mounted between the contact SW1 and the input of gate G1. Besides, the input of gate G1 is connected to the terminal + through a capacitor C6. The resistor R26 and the capacitor C6 form a delay circuit which establishes a time shift or delay between the switching the contact SW1 and the resulting new state at the input of the gate G1. Practically, such a delay allows an insuring that the gate G1 changes its state only when the magnetic circuit of the relay SW is completely closed. In fact, the contact SW1 may be switched while the vane of the relay has not achieved its travel, and then, the coil being no longer energized, the force of the magnet is not sufficient for attracting the vane. In this case, the relay is released. For the gate G2, such a circuit is not necessary since the vane is repelled.

Figure 7:
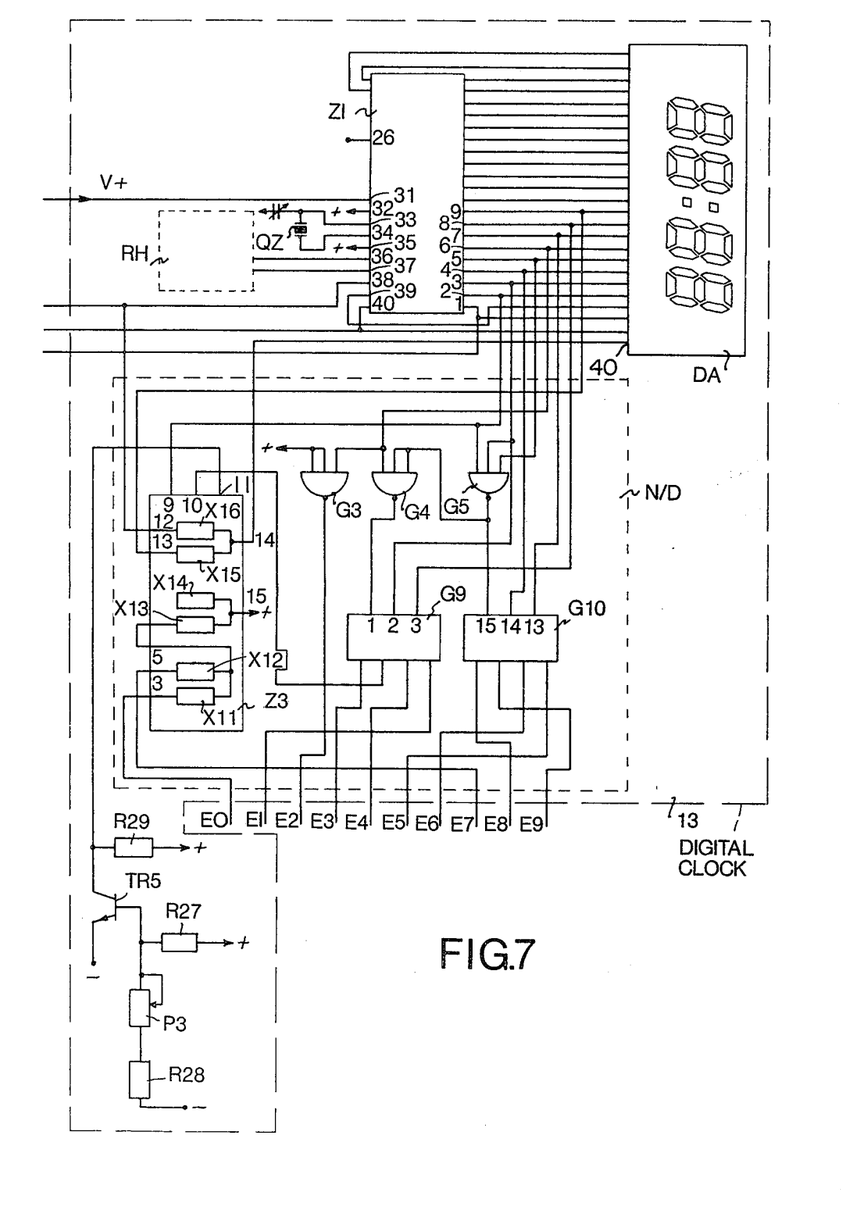
FIG. 7 is the schematic representation of an alternative for the digital/decimal converter of the FIG. 3, with a primary cell voltage drop sensor.

The FIG. 7 depicts an alternative for the converter N/D, with the gates G3 to G5 and the circuits G9 and G8 have been replaced by an integrated circuit Z3 which, in this example, is of the type MC 14053BCP as for integrated circuit Z2. Moreover, the circuit Z3 is used in a ciruit which is provided for testing the voltage of the primary cells of the source 11.

The circuit Z3 comprises three pairs of electronic contacts X11 to X16. The contact X11 is closed when the terminal "9" is at a high level, and the contact X12 is closed when the terminal is at a low level. The contact X13 is closed when the terminal "10" is at a high level, the contact X14 being not used in this example. The contact X15 is closed when the terminal "11" is at a high level, and the contact X15 is connected to the terminal +. In the circuit, the terminals "1" and "2" are interconnected, the terminal "9" is connected to the output "2" of the circuit Z1, the terminal "10" is connected to the second output of the circuit G9, the terminal "5" is connected to the input E0 of the matrix 14, and the output "3" is connected to the input E7 of the matrix.

When the inputs "9" and "10" are respectively at high and low levels, the potential + of terminal 15 is transferred to the terminal "5", i.e. to E7, through contacts X13 and X12. When both inputs "9" and "10" are at a low level, the potential + terminal 15 is transferred to the terminal i.e.; to E0, through contact X13 and X11. It shall be ascertained that the same result is obtained with the circuit of the FIG. 3.

The terminal "11" is connected to the collector of a PNP transistor TR5, of which the emitter is connected to the terminal − and the base, to a tapping point of a voltage divider. The divider is mounted between the terminals + and − and comprises the resistor R27 of 560 kilohms, the potentiometer P3 of 47 kilohms and the resistor R28 of the 62 kilohms, and the tapping point being the junction between resistor R27 and P3. The collector of transistor TR5 is connected to the terminal + through a resistor R29 of 1 megohm. The sliding contact of the potentiometer allows a sharp adjustment of the voltage on the base of TR5 with respect to the voltage on its emitter.

The terminal "12" of integrated circuit Z3 is connected to the output "38" (back panel) of integrated circuit Z1, the output being not directly connected to the terminal "40" of the displaying device DA as in FIG. 3. The terminal "13" of integrated circuit Z3 is connected to the output "9" of the circuit Z1. The output is connected to the displaying device DA for insuring the blinking at 1 Hz of the light points betweeen the hours and the minutes. The terminal "14" of Z3 is connected to the terminal "40" of DA.

When the primary cells S1 to S3 are charged, the voltage between the base and the emitter of transistor TR5 is normally higher than 0.6 V, such that the transistor is conducting. Therefore, the terminal "11" is at high level, the contact X13 being closed in this case, such that the output "38" of integrated circuit Z1 is connected to the input "40" of the displaying device DA, through contact X15, and that the device operates normally.

When the voltage of the primary cells is down, such that the base-emitter voltage of transistor TR5 is lower than 0.6 V, the transistor is turned off, and the terminal "11" comes to a low level. The terminal "38" is no longer connected to the terminal "40", by which the back panel data wire inhibited, but the blinking terminal "9" of integrated circuit Z1 is connected to the terminal "40" of digit display DA, through contact X16. As a result, the totality of the displayed data are blinking, the segments of the correct information being lighted alternatively with other segments which are used in the correct information. The user is thus informed that the cells must be replaced.

The graphs of the FIGS. 5a to 5e illustrate the comfort and lowered states as a function of the time, for the five programs PR5, PR1, PR2, PR4 and PR3, respectively.

Figure 8:
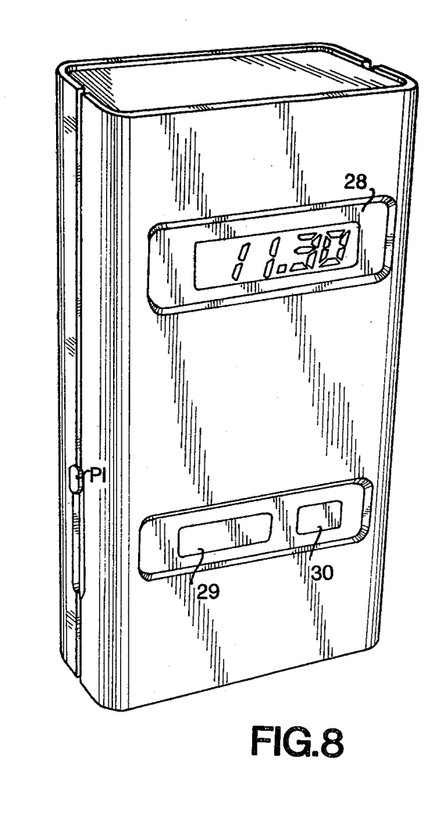
FIG. 8 is a perspective view of the front face of the device according to the invention.
Figure 9:
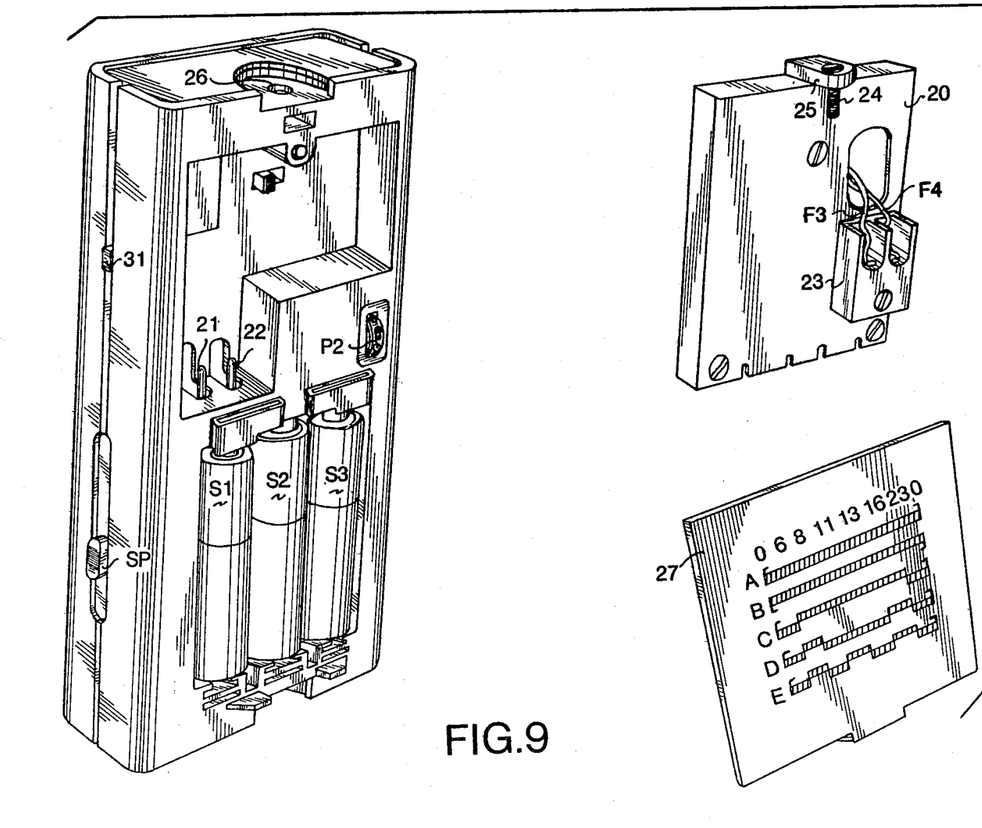
FIG. 9 is a perspective view of the rear face of the device of the FIG. 8, its fixed connector being apart.

The perspective views of the FIGS. 8 and 9 allow the reader to estimate the sizes of an embodiment according to the invention, with respect to the sizes of the primary cells S1 to S3. As seen in FIG. 9, the apparatus is mounted on a support 20 which is fastened onto a wall and coupled to the heat source by means of the wires F3 and F4. The apparatus is provided with two connectors 21 and 22 which are plugged from the bottom to the top in the contacts of a female connector 23, the wires F3 and F4 being connected to the latter. At the top of the support 20, a screw 24 is provided and supported by a hanger 25 for a threading engagement with a hole 26 in the housing of the apparatus. The compartment of the cells S1 to S3 may be closed by a sliding plate 27 on which are printed or cut the program graphs of the FIGS. 5a to 5e. On the side of the housing, a knob SP may be vertically displaced for selecting one of the programs, while, on the other side, the knob P1, (FIG. 8) may be vertically displaced for selecting the comfort temperature. At the top of the front panel of the housing, a window 28 allows the user to read the time of the displayer, and, at the bottom, two windows 29 and 30 allow the user to read the comfort temperature and the program which have been selected.

The potentiometer P2 (FIG.9) is adjusted by a knurled knob which is preferably hidden at the rear of the housing for preventing it from being accidentally changed, and thus insuring a convenient difference of temperature between the comfort temperature and the lowered temperature.

The knob 31 on the side of the apparatus is used for the time reset of the clock.

In some countries, the time is displayed from 0H to 11H with a notation A.M. or P.M., or the like, and, in this case, the clock outputs corresponding to the notations are used in the circuit Z2 in the same way that the ten outputs are used.

What is claimed is:

1. An environment thermostat assembly with a daily programming device, comprising a thermostat, a digital clock with a seven segment display device, a programming selecting circuit with two temperature reference values, a reference value switching device, and a control circuit for controlling the switching circuit, said control circuit being monitored by the digital output signal of the digital clock and by the program selecting circuit, wherein the control circuit comprises a digital/decimal converter for converting the hour unit digital data into a one out of ten code signal, the ten outputs of the converter (N/D) being connected to the vertical wires of a cross-point matrix having three pair of output wires, the output pairs being respectively assigned to the hours of which the tenth figure is 2, 1 and 0, said output wires being connected to the corresponding input of a logical circuit which has also a number of inputs connected to the active outputs of the clock when the hour tenth figure is 1 or 2, respectively, some cross-points of the matrix being selectively connected in accordance with the different predetermined programs, electronic contacts being mounted on the output wires of the matrix and controlled by the program selecting circuit, the output of the logical circuit being connected to a reference value adjusting potentiometer, the voltage transmitted to said potentiometer through the output of the logical circuit varying between two values in accordance with the logical levels of the outputs of the logical circuit.

2. A thermostat assembly as defined in claim 1, wherein the program selecting circuit has a number of outputs directly connected to the logical circuit, in order to bring the output potential of said logical circuit at a value or another one, whatever be the time.

3. A thermostat assembly as defined in claim 1, wherein the thermostat comprises a bistable relay, means for energizing the coil of said relay in one direction or the other during the successives changes of state of the output signal of the temperature sensor of the thermostat, one of the contacts of said relay closing or opening the output circuit of the thermostat, and means for de-energizing the coil between the changes of state of said output signal.

4. A thermostat assembly as defined in claim 3, wherein the output of the temperature sensor, which is at high level for a heat demand and at a low level in the other case, is connected to the first two inputs of first and second NAND gates directly and through an inverter, the second inputs of said first and second NAND gates being respectively connected to the stationnary make contact and the stationnary rest contact of a second contact of the coil of which the moving contact is at low level, the outputs of the first and second NAND gates being respectively connected to the control inputs of a first and a second electronic contacts, the first electronic contact being mounted between the positive terminal of a first cell and the first terminal of the coil of which the second terminal is connected to the negative terminal of said first cell, and the second electronic contact being mounted between the negative terminal and the second cell and the first terminal of the coil of which the second terminal is connected to the positive terminal of the second cell, the first contact being open when at rest position.

5. A thermostat assembly as defined in claim 4, wherein a delay circuit is mounted between the second input of the first NAND gate and the corresponding stationnary contact of the second contact.

6. A thermostat assembly as defined in claims 1 to 5, wherein the digital clock is fed by the cell source.

7. A thermostat assembly as defined in claims 1 to 5 wherein an inverter is mounted between the back panel output terminal of the clock and the corresponding input terminal of the display device, the other input terminal of said inverter being connected to the blinking output of the clock digital circuit, said inverter being controlled by a circuit which measures the voltage of the cell source and which switches said blinking terminal to the back panel signal input of the display device when said voltage falls below a predetermined value.

8. A thermostat assembly as defined in claim 2, wherein the thermostat comprises a bistable relay, means for energizing the coil of said relay in one direction or the other during the successive changes of state of the output signal of the temperature sensor of the thermostat, one of the contacts of said relay closing or opening the output circuit of the thermostat, and means for de-energizing the coil between the changes of state of said output signal.

9. A thermostat assembly as defined in claim 6, wherein an inverter is mounted between the back panel output terminal of the clock and the corresponding input terminal of the display device, the other input terminal of said inverter being connected to the blinking output of the clock digital circuit, said inverter being controlled by a circuit which measures the voltage of the cell source and which switches said blinking terminal to the back panel signal input of the display device when said voltage falls below a predetermined value.

* * * * *